United States Patent [19]

Sakowski et al.

[11] Patent Number: 5,268,913

[45] Date of Patent: Dec. 7, 1993

[54] FREQUENCY-DOUBLING SOLID STATE LASER

[75] Inventors: Harald Sakowski, Lauchheim; Karl Brenner, Aalen-Waldhausen; Peter Greve, Essingen, all of Fed. Rep. of Germany

[73] Assignee: Carl-Zeiss-Stiftung, Heidenheim, Fed. Rep. of Germany

[21] Appl. No.: 18,049

[22] Filed: Feb. 16, 1993

[30] Foreign Application Priority Data

Feb. 19, 1992 [DE] Fed. Rep. of Germany ....... 4205011

[51] Int. Cl.⁵ .............................................. H01S 3/10
[52] U.S. Cl. ........................................ 372/22; 372/99; 372/69; 372/93
[58] Field of Search .................. 372/22, 21, 99, 71, 372/69, 75, 92, 93

[56] References Cited

U.S. PATENT DOCUMENTS

| | | |
|---|---|---|
| 4,710,940 | 12/1987 | Sipes, Jr. ............................. 372/75 |
| 4,785,459 | 11/1988 | Baer ..................................... 372/75 |
| 4,841,528 | 6/1989 | Sipes, Jr. et al. .................... 372/22 |
| 4,872,177 | 10/1989 | Baer et al. ........................... 372/75 |
| 4,951,294 | 8/1990 | Basu et al. .......................... 372/75 |
| 5,119,383 | 6/1992 | Duling, III et al. .................. 372/22 |

Primary Examiner—John D. Lee
Assistant Examiner—John Ngo
Attorney, Agent, or Firm—Walter Ottesen

[57] ABSTRACT

The invention is directed to a frequency-doubling solid state laser having pump light sources at opposite ends thereof. A folding and out-coupling mirror is antireflection coated on both sides with respect to the wavelength of the light generated by the pump light sources. The pump light sources include a total of four laser diodes with each laser diode generating 3 Watts of light power. An output power at 532 nm is obtained using a Nd:YAG laser rod and a frequency-doubling crystal made of potassium titanyl phosphate. The folding angle defined by the folding and out-coupling mirror is in the range of 10° to 60° and is typically 50°.

5 Claims, 2 Drawing Sheets

FREQUENCY-DOUBLING SOLID STATE LASER

FIELD OF THE INVENTION

The invention relates to a frequency-doubling solid state laser having a folded resonator and pump light sources having laser diodes at two ends, a laser rod, a first, second and third resonator mirror, a frequency doubler crystal and two pump light sources with at least one laser diode each. The light of the two pump light sources is directed toward the laser rod by two resonator mirrors positioned opposite each other.

BACKGROUND OF THE INVENTION

A solid state laser of this kind is known from U.S. Pat. No. 4,951,294, particularly FIG. 2 thereof. This solid state laser is specifically designed for pulsed operation with a modelock. The frequency doubler crystal is either immediately adjacent to or combined with the laser rod. The laser rod, frequency doubler crystal and both curved resonator mirrors must be optimally reflection-/antireflection coated at the same time for three wavelengths: wavelength of the pump light, laser fundamental wavelength and harmonic wavelength. Only compromises in reflection/antireflection coatings are possible, especially for curved mirrors. Even these compromises, despite high production cost, cannot prevent considerable light loss.

U.S. Pat. No. 4,710,940, particularly FIG. 2A, describes a solid state laser without frequency doubling, which is pumped from both ends by laser diodes. A third mirror functions only to couple out the laser light.

U.S. Pat. No. 4,872,177 discloses a frequency-doubling solid state laser with a folded resonator which is pumped only from one end by laser diodes. The deflection mirror is concave.

SUMMARY OF THE INVENTION

The object of the invention is to provide a laser diode pumped frequency-doubling solid state laser that achieves a higher efficiency with a simplified production and which is equally suitable for continuous wave (CW) operation and pulsed operation.

The frequency-doubling solid state laser of the invention includes: first, second and third resonator mirrors conjointly defining a resonator; a laser rod defining a first optical axis of the resonator and having first and second end faces on the first optical axis; the first and third resonator mirrors being arranged on the axis on opposite sides of the laser rod; first and second pump light sources arranged on the axis opposite the first and third mirrors for generating and projecting respective light beams through the first and third mirrors, respectively, toward the first and second end faces, respectively, of the laser rod; the third resonator mirror being mounted between the second light source and the second end face of the laser rod for defining a second optical axis of the resonator folded with respect to the first optical axis; the second resonator mirror being arranged on the second optical axis; the third resonator mirror including a transparent planar plate and a resonator surface mirror formed on one side of the planar plate so as to face toward the laser rod; frequency-doubling crystal means arranged on the second optical axis whereby light from the pump light sources does not pass through the frequency-doubling crystal means; and, a focusing lens interposed between the third resonator mirror and the frequency-doubling crystal means.

With the new geometry, in which the laser rod and the frequency doubler crystal are arranged in respective ones of the two arms of the folded resonator, only the third resonator mirror, effecting the folding in the resonator, is impinged by the light of three wavelengths and is accordingly difficult to provide with reflection and antireflection coatings. All other components, especially the frequency doubler crystal, will be affected by only two wavelengths. This is much easier to control and represents the functionally required minimum. Because the third resonator mirror can be made as a planar mirror by including a focusing lens, the divergence of the light paths passing the reflection and antireflection coatings is strongly diminished thereby increasing the effectiveness of the coatings significantly.

Advantageously, the first and second pump light sources each contain two laser diodes and the light of the laser diodes is superposed by means of polarizing beam splitters. This known and relatively simple procedure for doubling the pump power is suitably used. In the next step, in accordance with the invention, further doubling is achieved by pumping at both ends.

An advantage provided by the plane-parallel plate forming the third resonator mirror, is that, apart from the high grade reflective coating for the light of the second wavelength from the laser rod, it has on both sides antireflective coatings for the first wavelength of the pump light sources and the third wavelength of the frequency doubler crystal. These coatings are designed for a specific angle through which the third resonator mirror folds the axis of the laser beam. The folding angle is preferably 10° to 60°, which allows sufficient space for the component elements, arranged side by side, and for a compact arrangement.

In another embodiment of the laser of the invention, it is also possible to couple out and to use the second, not doubled, wavelength of the laser rod if a suitable, movable optical element is arranged between the laser rod and the frequency doubler crystal.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
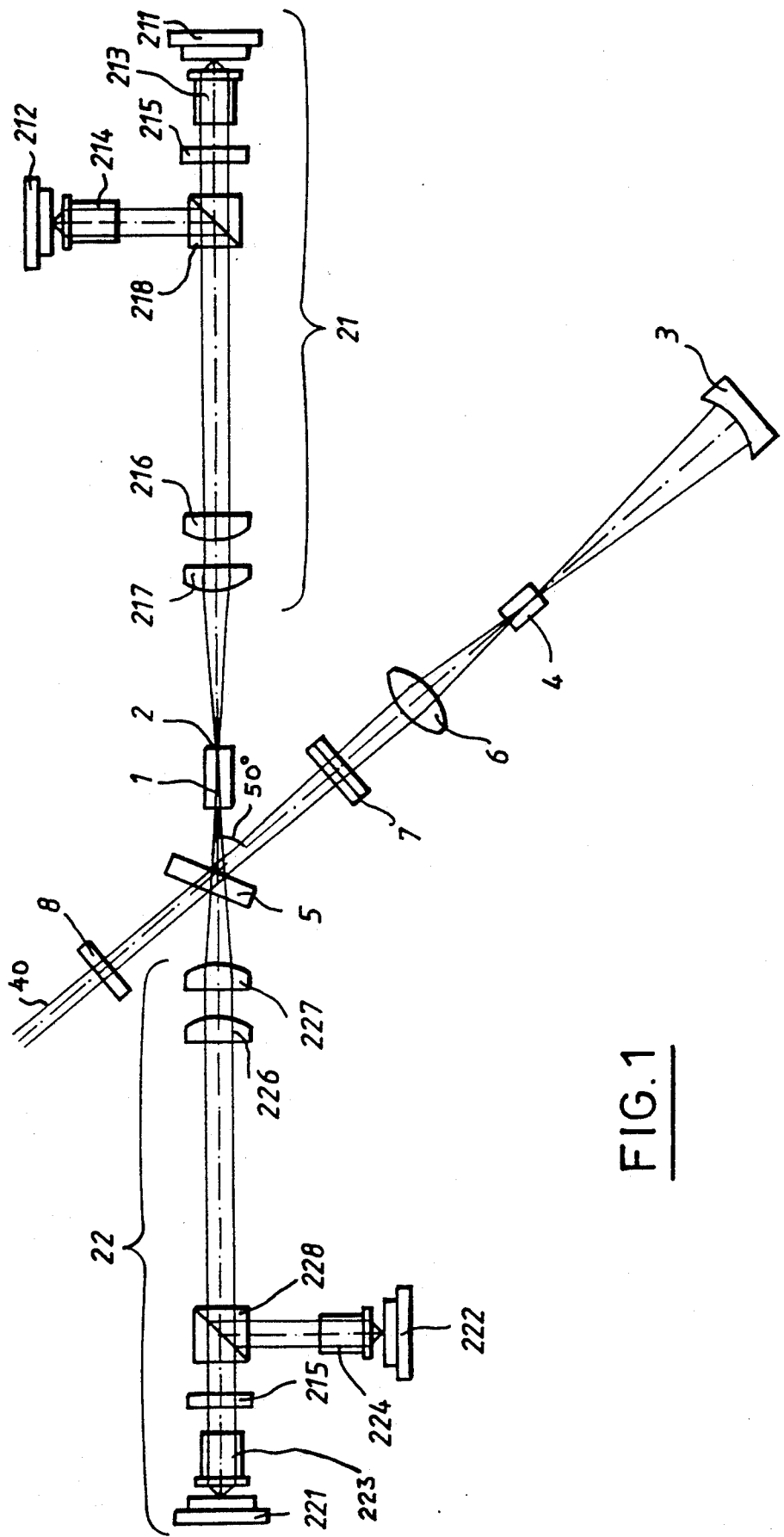
FIG. 1 shows an embodiment of a solid state laser in a schematic plan view; and, FIG. 2 shows an alternate embodiment of the laser according to the invention.

The laser rod 1 in the embodiment of FIG. 1 is a Nd:YAG crystal having 1.1% Nd-dopant and having a diameter of 4 mm and a length of 10 mm. The Nd:YAG crystal is manufactured by Allied Optolase and distributed by Laser 2000 GmbH of Munich, Germany. The back of the crystal is coated as a resonator mirror 2 with R=99.9% reflection for the second wavelength $\lambda_2 = 1064$ nm of the laser rod 1. The front of the crystal is provided with an antireflection coating for $\lambda_2$ with R=0.01% residual reflection. Both sides are antireflection coated having a 0.1% residual reflection for the light of the first wavelength $\lambda_1 = 808$ nm of the pump light sources (21, 22), which are described below.

The second resonator mirror 3 is spherically concave having a radius of 60 mm and is reflection coated with R=99.5% reflection for $\lambda_2$ and for the third wavelength $\lambda_3=532$ nm of the frequency doubler crystal 4.

The concave form of the second resonator mirror 3, together with the lens 6 having a focal length of f=29 mm and two-sided antireflection coating (R<0.03%) for $\lambda_2$ and $\lambda_3$, effects a focusing of the light of the second wavelength $\lambda_2$ upon the frequency doubler crystal 4 made of potassium titanyl phosphate (KTP). The frequency doubler crystal 4 has the dimensions 2.2×2.2×4.6 mm³ and two-sided antireflection coating (R<0.03%) for $\lambda_2$ and $\lambda_3$ so that the frequency conversion takes place with high efficiency.

The $\lambda/4$-plate 7 is designed for the zero order of $\lambda_2$ and is likewise antireflection coated (R<0.01%) for $\lambda_2$ and $\lambda_3$. The $\lambda/4$-plate serves for the selection of two resonator modes oriented orthogonally to each other. Fluctuations in the output power are suppressed and a slight increase in efficiency is obtained as well.

The light of the laser rod 1 reaches the third resonator mirror 5 at an angle of incidence of 25° so that the axis of the resonator is folded by 50° as shown.

The plane-parallel glass plate defines the third resonator mirror 5. For the angular position shown, the glass plate 5 is reflection coated R=99.5% for $\lambda_2$ on the side thereof facing toward the laser rod 1.

The glass plate 5 is antireflection coated for the doubled wavelength $\lambda_3$ with R≦4% on the resonator side thereof and with R=0.03% on the back side thereof so that the visible laser beam from the frequency doubler crystal 4 is coupled out by the third resonator mirror 5.

According to the invention, the pump light of the second pump light source 22 is also directed toward one end face of the laser rod 1 by the third resonator mirror 5. For this purpose, the third resonator mirror 5 is antireflection coated for $\lambda_1$ on the rearward side thereof with R=0.33% and with R≦4% on the resonator side thereof.

The values of the residual reflection (R) are not entirely optimal here because the third resonator mirror 5 must provide three different functions on the resonator side thereof, namely: highly reflective for $\lambda_2$, antireflection coated for $\lambda_1$ and $\lambda_3$.

The arm of the resonator having the laser rod 1 is approximately 24 mm long and the arm of the resonator having the frequency doubler crystal 4 is approximately 98 mm.

The two pump light sources (21, 22) are arranged axially, at opposite ends of the laser rod 1. The pump light sources are of identical configuration and each contains a first laser diode (211, 221) and a second laser diode (212, 222) with each laser diode having the power of 3 W (Type Spectra Diode Labs SDL 2482 PL) with the wavelength $\lambda_1=808$ nm. The required power supply, cooling and control devices are known to those skilled in this art and therefore are not described here.

Each laser diode (211, 212, 221, 222) is provided with a collimator system (213, 214, 223, 224). The collimator systems comprise four lenses with f=6.5 mm, NA=0.5 and they are antireflection coated with 87.3% transmission for $\lambda_1$. A $\lambda/2$-plate (215, 225), configured as a double plate with an air gap and antireflection coated with R<0.25%, is arranged in the beam path defined by each laser diode (211, 221) which passes through the polarizing beam splitter (218, 228) along a straight line.

Because of the characteristics of the laser diodes (211, 212, 221, 222), the two superposed parallel and linearly polarized pump light beams each have a narrow rectangular cross section which is focused by one cylinder lens (216, 226) and one achromatic lens (217, 227) onto a region of the laser rod 1, which is matched to the mode volume. The cylinder lenses (216, 226) each have f=76.2 mm and are antireflection coated with R<0.5% and the achromatic lenses (217, 227) each have f=30 mm and R<1%.

A filter (BG 40) having an antireflection coating for $\lambda_3$ with R<1% is also arranged in the output beam path 40 behind the folding and outcoupling mirror 5. This filter 8 suppresses the disturbance components in the output beam 40 at the wavelengths $\lambda_1$ and $\lambda_2$.

In this exemplary embodiment, the four laser diodes (211, 212, 221, 222) emit 12 W total light power. After losses in the coupling optic, approximately 10.5 W reach the laser rod 1 which emits more than 5 W at $\lambda_2=1064$ nm. After frequency doubling, an output power of 1.5 W at $\lambda_3=532$ nm is achieved.

Figure 2:
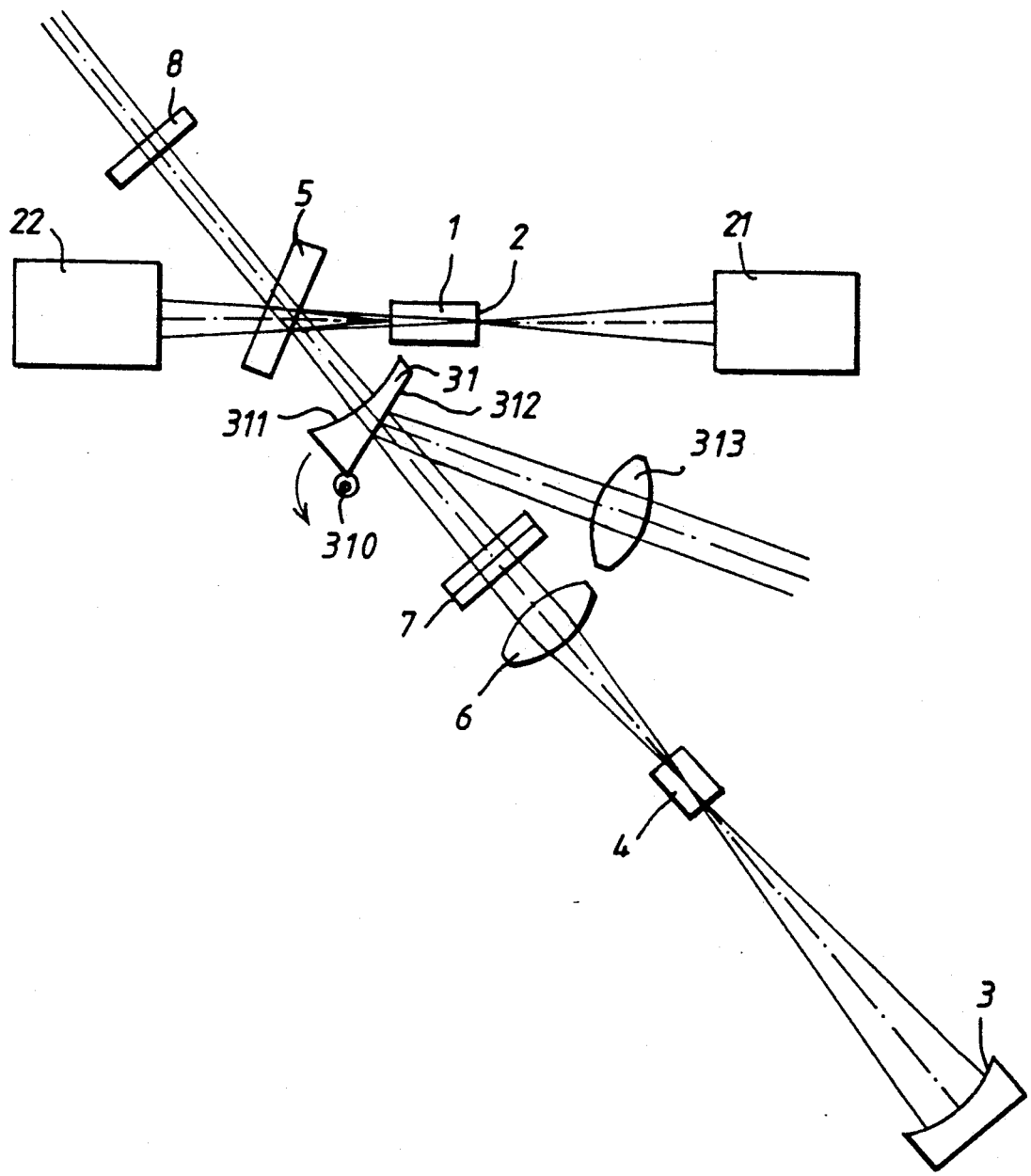

FIG. 2 shows an alternate embodiment of the laser described with respect to FIG. 1 which can be used selectively for two different wavelengths ($\lambda_2$ and $\lambda_3$). As far as the configuration is the same as in FIG. 1, the same parts are identified with the same reference numerals. An optical element 31 can be arranged between the laser rod 1 and the frequency doubler crystal 4. The optical element 31 is rotatable about the axis 310 and can thus be selectively pivoted into or out of the beam path of the laser.

The optical element 31 is designed as a concave resonator mirror 311 on the side thereof facing toward the laser rod 1 with a suitable radius and suitable reflection coating. The mirror 311 is mounted on a transparent carrier having an inclined polished and antireflection coated rear surface 312 so that the light passing through the mirror 311 is laterally coupled out of the laser arrangement when the optical element 31 is pivoted into the beam path of the laser. A lens 313 and, if necessary, further optical elements serve for beam shaping and beam guidance.

Therefore, the laser according to the invention can also be used selectively with the second wavelength $\lambda_2$ of the laser rod 1 or with the third wavelength $\lambda_3$ of the frequency doubler crystal 4 in the output, similarly as described in U.S. Pat. No. 4,933,945 incorporated herein by reference.

The laser of the invention can be operated with continuous wave (CW) as well as pulsed.

Other embodiments of the invention are possible within the scope of the invention. These embodiments include the application of different materials for the laser rod 1 and the frequency doubler crystal 4.

It is understood that the foregoing description is that of the preferred embodiments of the invention and that various changes and modifications may be made thereto without departing from the spirit and scope of the invention as defined in the appended claims.

What is claimed is:

1. A frequency-doubling solid state laser comprising:

first, second and third resonator mirrors conjointly defining a resonator;

a laser rod defining a first optical axis of said resonator and having first and second end faces on said first optical axis;

said first and third resonator mirrors being arranged on said axis on opposite sides of said laser rod;

first and second pump light sources arranged on said axis opposite said first and third mirrors for generating and projecting respective light beams through said first and third mirrors, respectively, toward said first and second end faces, respectively, of said laser rod;

said third resonator mirror being mounted between said second light source and said second end face of said laser rod for defining a second optical axis of said resonator folded with respect to said first optical axis;

said second resonator mirror being arranged on said second optical axis;

said third resonator mirror including a transparent planar plate and a resonator surface mirror formed on one side of the planar plate so as to face toward said laser rod;

frequency-doubling crystal means arranged on said second optical axis whereby light from said pump light sources does not pass through said frequency-doubling crystal means; and, a focussing lens interposed between said third resonator mirror and said frequency-doubling crystal means.

2. The frequency-doubling solid state laser of claim 1, said first and second pump light sources each comprising two laser diodes generating respective laser light beams; and, polarizing beam splitter means for superposing said laser light beams of said diodes.

3. The frequency-doubling solid state laser of claim 1, said pump light sources generating light having a first wavelength $\lambda_1$, said laser rod producing light having a second wavelength $\lambda_2$ and said frequency-doubling crystal means producing light having a third wavelength $\lambda_3$;

said planar plate being antireflective for said first and third wavelengths ($\lambda_1$ and $\lambda_3$) on both sides thereof; and, said planar plate being reflective on only one side thereof for said second wavelength $\lambda_2$; and, said laser rod, said first resonator mirror, said second resonator mirror and said frequency-doubling crystal means all being antireflective or reflective for only at most two of said wavelengths.

4. The frequency-doubling solid state laser of claim 3, further comprising an optical element defining a concave mirror; and, means for moving said optical element between a first position wherein said optical element is disposed on said second optical axis between said third resonator mirror and said frequency-doubling crystal means and a second position wherein said optical element is no longer on said second optical axis; and, said optical element being adapted to couple the light of said second wavelength $\lambda_2$ out of said solid state laser when said optical element is in said first position.

5. The frequency-doubling solid state laser of claim 1, said first and second optical axes conjointly defining a folding angle having a value in the range of 10° to 60°.

* * * * *